United States Patent
Hazlewood

(10) Patent No.: US 7,043,229 B2
(45) Date of Patent: May 9, 2006

(54) SYSTEM AND METHOD FOR DETERMINING TARIFFS FOR REAL-TIME CALLS INVOLVING PORTED DIRECTORY NUMBERS

(75) Inventor: Steve Hazlewood, Richardson, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 728 days.

(21) Appl. No.: 10/160,208

(22) Filed: May 31, 2002

(65) Prior Publication Data
US 2004/0203641 A1  Oct. 14, 2004

(51) Int. Cl.
*H04M 11/00* (2006.01)
(52) U.S. Cl. ............. 455/406; 379/221.13; 379/114.27
(58) Field of Classification Search ........... 379/221.13, 379/114.01, 114.2, 114.27, 114.28, 114.29, 379/115.02, 221.09; 455/432.3, 406; 370/467, 370/466, 401
See application file for complete search history.

(56) References Cited

U.S. PATENT DOCUMENTS

| | | | | |
|---|---|---|---|---|
| 5,572,579 A | * | 11/1996 | Orriss et al. ............ 379/142.01 |
| 5,629,974 A | * | 5/1997 | Rajala et al. ............... 455/466 |
| 5,966,431 A | * | 10/1999 | Reiman et al. ......... 379/115.01 |
| 6,327,349 B1 | | 12/2001 | Rollins |
| 6,418,206 B1 | * | 7/2002 | Leppanen ............... 379/114.01 |
| 6,445,785 B1 | * | 9/2002 | Chan et al. ............ 379/221.13 |
| 6,678,265 B1 | * | 1/2004 | Kung et al. ................. 370/352 |
| 6,697,469 B1 | * | 2/2004 | Koster ..................... 379/114.29 |
| 6,785,376 B1 | * | 8/2004 | Genette et al. ......... 379/221.09 |
| 6,880,105 B1 | * | 4/2005 | Genette et al. ............... 714/26 |
| 6,944,184 B1 | * | 9/2005 | Miller et al. ................. 370/467 |
| 6,967,956 B1 | * | 11/2005 | Tinsley et al. ............. 370/466 |
| 2003/0002639 A1 | * | 1/2003 | Huie ...................... 379/114.27 |

FOREIGN PATENT DOCUMENTS

WO  WO 02/054786 A1  7/2002

* cited by examiner

*Primary Examiner*—Ovidio Escalante
*Assistant Examiner*—Emeka D. Iwuchukwu

(57) ABSTRACT

A system and method for determining a tariff for a real-time wireless service such as a prepaid service (PPS) for a wireless telephone call. A Local Number Portability Point (LNPP) provides an interface between service scripts in a Service Control Point (SCP) or application server, and an LNP database. When an Initial Detection Point (IDP) message is received by the service scripts, a query is sent through the LNPP to the LNP database to determine whether the call is made to or from a ported telephone number. If so, a routing number is returned. The scripts determine whether the routing number points to the network operator's own network or another, and notify a Service Data Point (SDP). If the routing number points to the operator's own network, the SDP applies a first tariff to the call. If the routing number points to another network, the SDP applies a second tariff.

13 Claims, 3 Drawing Sheets

SYSTEM AND METHOD FOR DETERMINING TARIFFS FOR REAL-TIME CALLS INVOLVING PORTED DIRECTORY NUMBERS

BACKGROUND OF THE INVENTION

1. Technical Field of the Invention

This invention relates to telecommunication systems. More particularly, and not by way of limitation, the present invention is directed to a system and method of determining tariffs for wireless calls made to or from ported directory numbers.

2. Description of Related Art

Today, each wireless network operator has its own number series of Mobile Station Integrated Services Digital Network (MSISDN) numbers, referred to herein as directory numbers (DNs). A particular operator can easily tell which subscribers are its own subscribers, and which subscribers belong to other operators, by simply determining whether each subscriber's DN falls within the particular operator's number series. Because the wireless operators can tell which subscribers are their own, the operators typically set up different tariffs for calls between two or more of their own mobile subscribers, between one of their own mobile subscribers and a landline subscriber, or between one of their own subscribers and a mobile subscriber belonging to another wireless operator. For example, one tariff level (T1) may apply to in-network mobile-to-mobile calls between mobile subscribers who subscribe to a particular operator's services. A second tariff level (T2) may apply to calls that are from a landline subscriber to a mobile subscriber who subscribes to the particular operator's services and is operating within the operator's own network. A third level (T3) may apply to inter-network calls from a mobile subscriber in another operator's network towards a mobile subscriber who subscribes to the particular operator's services and is operating within the operator's own network. The operators have rating tables set up for calling numbers and called numbers so they can determine which tariff to set up.

When a call is set up as a prepaid call, or some other service requiring real-time billing, the operator uses the tariff derived from the rating table and deducts money from a prepaid account in real time as the call progresses. If the prepaid account is depleted while the call is still in progress, the operator may terminate the call. For other calls which are not billed in real time (i.e., post-paid calls), call data records (CDRs) are generated after the call is completed, and are sent to a billing center for processing.

Local Number Portability (LNP) (i.e., service provider portability) allows mobile subscribers to retain their directory numbers as the subscribers "port" from one service provider to another. In other words, a subscriber who initially obtains his service from Operator-A, and is provided with a DN within Operator-A's number series, may subsequently change his service to another operator such as Operator-B, and still retain the original DN. Since this subscriber continues to operate with a DN in Operator-A's number series, Operator-B cannot utilize the calling DN or called DN to determine the applicable tariff when the subscriber makes a real-time call such as a prepaid call. For example, if the subscriber above, who is ported-in to Operator-B's network, calls another mobile subscriber who subscribes to Operator-B's services and is operating within Operator-B's own network, the call should be charged at the T1 rate. However, by using the existing rating table, Operator-B would charge the call at the T3 rate because the ported subscriber would appear to be from Operator-A's network.

For post-paid calls, an LNP database is queried prior to the generation of the CDRs to determine whether the calling DN or called DN involved in a call have been ported. When one of the numbers has been ported, the CDRs indicate that fact, and the operators are then able to use their existing rating tables to determine the proper tariff, and to apply the tariff in the post processing. However, for calls requiring real-time billing, the rating using the current methodology will not be correct because the rating of the prepaid call takes place before the LNP database is queried.

In order to overcome this problem, it would be advantageous to have a system and method of determining in real time during call setup, when ported numbers are involved in a call. The present invention provides such a system and method.

SUMMARY OF THE INVENTION

In one aspect, the present invention is directed to a method of determining a tariff for a real-time wireless service provided for a wireless telephone call. The method includes the steps of determining during call setup whether the call is made to or from a ported telephone number, and if so, determining whether the ported telephone number points to a particular network. If the ported telephone number points to the particular network, the call is rated with a first tariff. If the ported telephone number does not point to the particular network, the call is rated with a second tariff.

In another aspect, the present invention is directed to a method of determining a tariff for a real-time wireless service provided for a wireless call made to or from a ported telephone number. The method includes receiving, by real-time service scripts, a call setup message formatted in a first signaling protocol and containing a called party number. The called party number is sent to a protocol converter where the first signaling protocol is converted to a second signaling protocol compatible with a Local Number Portability (LNP) database. This is followed by sending a query containing the called party number from the protocol converter to the LNP database, and receiving a query result from the LNP database. The result, which contains a routing number if the called party number has been ported, is returned to the service scripts. The service scripts then determine whether the routing number points to a particular network, and if so, the call is rated with a first tariff. If not, the call may be rated with a second tariff.

In yet another aspect, the present invention is directed to a system in a radio telecommunications network for determining a tariff for a real-time wireless service provided for a wireless telephone call. The system includes means for accessing an LNP database during call setup to determine whether the call is made to or from a ported telephone number; means for determining whether the ported telephone number points to a particular network, in response to a determination that the call is made to or from a ported telephone number; and means for assigning a tariff to the call in response to a determination that the call is made to or from a ported telephone number, and in response to a determination that the ported telephone number points to a particular network.

In still yet another aspect, the present invention is directed to a Service Control Point (SCP) in a telecommunications network. The SCP includes service scripts that implement a real-time service. The scripts include means for receiving a call setup message containing a called party number, and means for sending rated events to a Service Data Point (SDP) for assigning a tariff to a call. The tariff may vary if the called party number is ported-in or ported-out of a particular network. The SCP also includes an interface that receives the called party number from the service scripts and sends a query message containing the called party number to an LNP database. The interface also receives a query result from the LNP database containing a routing number if the called party number is ported, and passes the routing number to the service scripts. The means for sending rated events to the SDP then sends an indication to the SDP of whether the called party number is ported-in or ported-out of the particular network.

In still yet another aspect, the present invention is directed to service logic for implementing a real-time service in a telecommunications network. The service logic includes means for receiving a call setup message containing a called party number, and means for sending the called party number to an interface with an LNP database, and for receiving a routing number from the interface if the LNP database reports that the called party number is ported. The service logic also includes means for sending rated events to an SDP for assigning a tariff to the call, the tariff varying if the called party number is ported-in or ported-out of a particular network. The means for sending rated events notifies the SDP whether the called party number is ported-in or ported-out of the particular network, or whether the called party number is an un-ported number that belongs to the particular network or another network.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention enables wireless system operators to correctly charge for and switch prepaid calls to mobile subscribers with numbers that have been ported using LNP. The invention can be used in a multi-vendor network with multi-vendor Mobile Switching Centers/Service Switching Points (MSC/SSFs) and/or Home Location Registers (HLRs). The invention can be used with any prepaid or other real-time service.

The invention allows the operators to determine tariffs in real time, even when one or more of the DNs involved in the call is ported. The invention enables the operators to continue to provide different tariff rates for different types of calls (for example, mobile-to-mobile calls, landline-to-mobile calls, etc.), thereby stimulating more calls of a desirable type.

Figure 1:
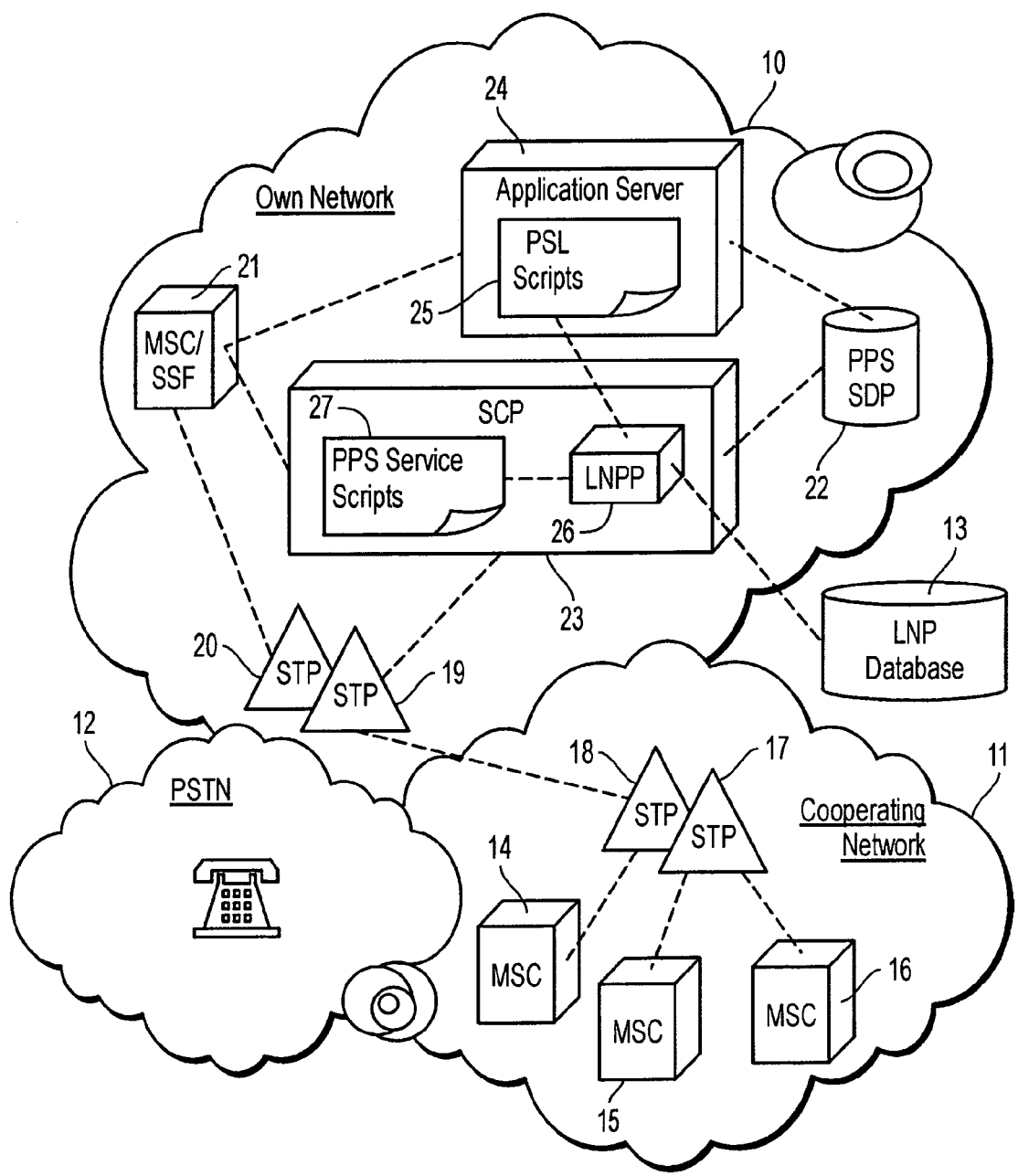
FIG. 1 is a simplified block diagram of a plurality of interconnected telecommunications networks in which the system of the present invention has been implemented.

FIG. 1 is a simplified block diagram of a plurality of interconnected telecommunications networks in which the system of the present invention has been implemented. A wireless operator's Own Network 10, a wireless Cooperating Network 11, the landline Public Switched Telephone Network (PSTN) 12, and an LNP Database 13 are shown, although a greater or lesser number of interconnected networks could be utilized. A number of standard network components are illustrated along with the new components provided by the present invention. Within the Cooperating Network are Mobile Switching Centers (MSCS) 14–16 and Signal Transfer Points (STPs) 17 and 18. The STPs interconnect the Cooperating Network 11 with the wireless operator's Own Network 10 through STPs 19 and 20 within the Own Network.

Also located within the Own Network 10 are an MSC/SSF 21, a Prepaid Service-Service Data Point (PPS SDP) 22, and a modified Service Control Point (SCP) 23. The PPS SDP includes modified rating structures (data requirements only) for implementation of the present invention. An Application Server 24 is also illustrated, and in some networks, modified Prepaid Service Logic (PSL) Scripts 25 within the Application Server are utilized along with a new Local Number Portability Point (LNPP) 26 in the modified SCP to implement the new functionality introduced by the present invention. In another embodiment, the new functionality introduced by the present invention may be implemented utilizing modified PPS Service Scripts 27 in the SCP, along with the LNPP 26. In this embodiment, the Application Server is not required.

In the present invention, the LNPP 26 functions as an interface and protocol converter, enabling either the PPS Service Scripts 27 or the PSL Scripts 25, depending on the network configuration, to communicate with the LNP Database 13 in real time during call setup to support real-time rating for prepaid and other real-time services. Currently, when a prepaid service is invoked, operators have no indication whether the calling or called DNs are ported numbers. With the present invention, operators can do a port on the calling number or the called number, depending on the call case, within the prepaid context.

Figure 2:
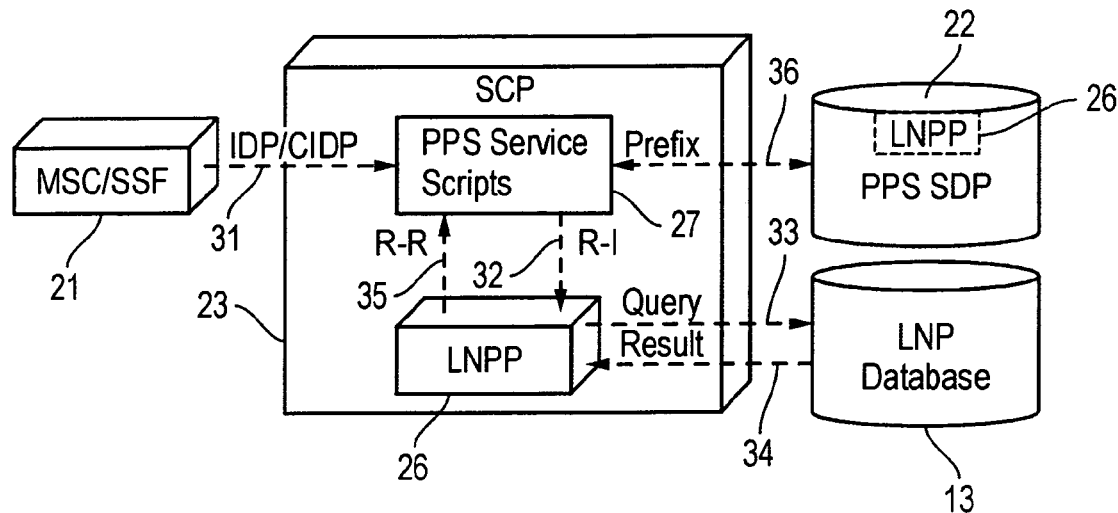
FIG. 2 is a simplified block diagram of a first embodiment of the system of the present invention when handling a mobile origination and forwarding traffic case.

FIG. 2 is a simplified block diagram of a first embodiment of the system of the present invention when handling a mobile origination and forwarding traffic case. In this embodiment, modified PPS Service Scripts 27 within the SCP 23 are utilized along with the new LNPP 26 to implement the new functionality introduced by the present invention. The LNPP 26 is preferably implemented in the SCP 23, but may also be implemented in another node such as the PPS SDP 22 which communicates with the PPS Service Scripts 27 or the PSL Scripts 25.

During call setup, the MSC/SSF 21 sends a CS1+ Initial Detection Point (IDP) message 31 or a CAMEL Application Part (CAP) v2 CAP Initial Detection Point (CIDP) message to the SCP 23 where the message is received by the PPS Service Scripts 27. The Call State-1(CS1) protocol is described in ITU-T Recommendation Q.1218, which is hereby incorporated by reference herein in its entirety. An enhanced version (CS1+) is utilized herein to carry additional message parameters to implement the functionality of the present invention. The IDP message contains the MSISDN of the PPS subscriber and the Called Party Number (CdPN).

The PPS Service Scripts send a CS1+ Retrieve-Invoke (R-I) message 32 to the LNPP 26 with the CdPN that potentially has been ported. The LNPP converts the CS1+ protocol to a protocol recognized by the LNP Database 13 such as an ANSI-41 interface, an 800 interface, or an INAP interface. The LNPP then sends a query 33 to the LNP Database 13 containing the CdPN received in the Retrieve-Invoke message. The LNP Database returns a query result 34 to the LNPP. If the CdPN has been ported, the query result contains a routing number (RN). If no RN is received, it is assumed that the CdPN has not been ported. The LNPP converts the protocol and sends a CS1+ Retrieve-Result (R-R) message 35 back to the PPS Service Scripts with the RN as an optional parameter.

Based on the LNP Database query result received in the R-R message 35 from the LNPP, the PPS Service Scripts 27 determine a prefix 36 used to identify whether the call is within the operator's Own Network 10, or in another network. The prefix values are operator definable. Exemplary prefix values are shown below in Table 1.

TABLE 1

| Prefix | Description |
| --- | --- |
| xx | RN received, RN pointing to own network (i.e., ported in) |
| yy | RN received, RN pointing to other network (i.e., ported out) |
| xx | RN not received, CdPN belongs to own network |
| yy | RN not received, CdPN belongs to other network |

The existing PPS Service Scripts may be modified to add the correct prefix to an Originating Location Information parameter (or Terminating Location Information, depending on the traffic case) that is sent as part of each rated event (for example, First Interrogation, Intermediate Interrogation, or Final Report of Set Up USSD Call Back) to the PPS SDP 22 for rating. The prefix for an RN that is ported in, and the prefix for an un-ported CdPN that belongs to the Own Network may be the same if the operator desires the rating to be the same for these cases. Likewise, the prefix for an RN that is ported out, and the prefix for an un-ported CdPN that belongs to the other network may be the same if the operator desires the rating to be the same for these cases. After rating the call in the PPS SDP, the PPS Service Scripts 27 continue normal prepaid call processing with the prefix 36 in the Originating Location Information taken into account.

If the Location Information is not present in the Call Instance Data, the parameter is created and contains only the prefix. In addition to these changes, the Originating/Terminating Location Information is added to the Call Data Record (CDR).

Figure 3:
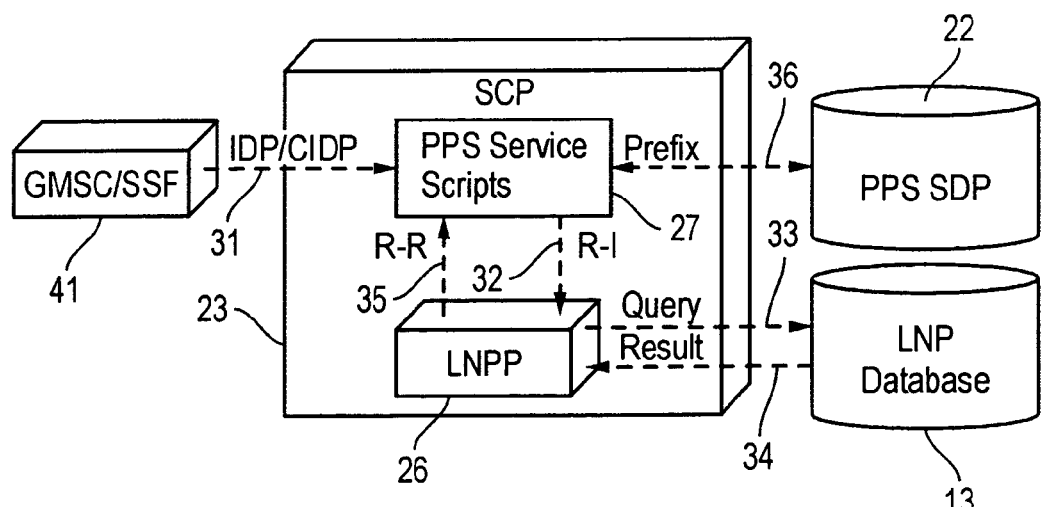
FIG. 3 is a simplified block diagram of the first embodiment of the system of the present invention when handling a mobile termination traffic case.

FIG. 3 is a simplified block diagram of the first embodiment of the system of the present invention when handling a mobile termination traffic case. In the mobile termination case, the call enters the system through a Gateway MSC/SSF (GMSC/SSF) 41 which sends a CS1+ IDP or CIDP message 31 to the SCP 23 where the message is received by the PPS Service Scripts 27. The IDP message contains the MSISDN of the PPS subscriber and the CdPN.

The PPS Service Scripts send a CS1+ Retrieve-Invoke (R-I) message 32 to the LNPP 26 with the CdPN that potentially has been ported. The LNPP converts the CS1+ protocol to a protocol recognized by the LNP Database 13 such as an ANSI-41 interface, an 800 interface, or an INAP interface. The LNPP then sends a query 33 to the LNP Database 13 containing the CdPN received in the Retrieve-Invoke message. The LNP Database returns a query result 34 to the LNPP. If the CdPN has been ported, the query result contains an RN. If no RN is received, it is assumed that the CdPN has not been ported. The LNPP converts the protocol and sends a CS1+ Retrieve-Result (R-R) message 35 back to the PPS Service Scripts with the RN as an optional parameter. Based on the LNP Database query result received in the R-R message 35 from the LNPP, the PPS Service Scripts 27 determine the prefix 36 used to identify whether the call is within the operator's Own Network 10, or in another network. Exemplary prefix values are shown above in Table 1.

The PPS Service Scripts 27 add the correct prefix to a Terminating Location Information parameter that is sent as part of each rated event (for example, First Interrogation, Intermediate Interrogation, or Final Report of Set Up USSD Call Back) to the PPS SDP 22 for rating. After rating the call in the PPS SDP, the PPS Service Scripts continue normal prepaid call processing with the prefix 36 in the Terminating Location Information taken into account.

Figure 4:
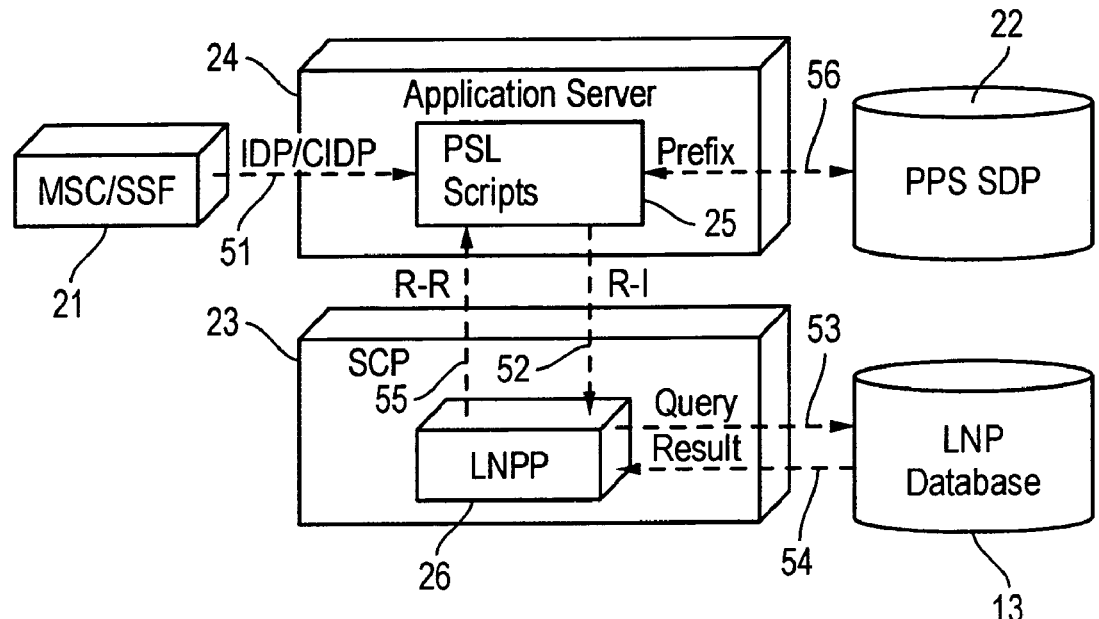
FIG. 4 is a simplified block diagram of a second embodiment of the system of the present invention when handling a mobile origination and forwarding traffic case.

FIG. 4 is a simplified block diagram of a second embodiment of the system of the present invention when handling a mobile origination and forwarding traffic case. In this embodiment, modified PSL Scripts 25 within the Application Server 24 are utilized along with the new LNPP 26 in the modified SCP to implement the new functionality introduced by the present invention.

The MSC/SSF 21 sends a CS1+ IDP or CIDP message 51 to the Application Server 24 where the message is received by the PSL Scripts 25. The IDP message contains the MSISDN of the PPS subscriber and the CdPN. The PSL Scripts send a CS1+ Retrieve-Invoke (R-I) message 52 to the LNPP 26 in the SCP 23 with the CdPN that potentially has been ported. The LNPP converts the CS1+ protocol to a protocol recognized by the LNP Database 13 such as an ANSI-41 interface, an 800 interface, or an INAP interface. The LNPP then sends a query 53 to the LNP Database 13 containing the CdPN received in the Retrieve-Invoke message.

The LNP Database returns a query result 54 to the LNPP. If the CdPN has been ported, the query result contains an RN. If no RN is received, it is assumed that the CdPN has not been ported. The LNPP converts the protocol and sends a CS1+ Retrieve-Result (R-R) message 55 back to the PSL Scripts 25 in the Application Server with the RN as an optional parameter. Based on the LNP Database query result received in the R-R message 55 from the LNPP, the PSL Scripts determine a prefix 56 used to identify whether the call is within the operator's Own Network 10, or in another network. Exemplary prefix values are shown above in Table 1.

The PSL Scripts 25 add the correct prefix to an Originating Location Information parameter that is sent as part of each rated event (for example, First Interrogation, Intermediate Interrogation, or Final Report of Set Up USSD Call Back) to the PPS SDP 22 for rating. After rating the call in the PPS SDP, the PSL Scripts continue normal prepaid call processing with the prefix 56 in the Originating Location Information taken into account.

Figure 5:
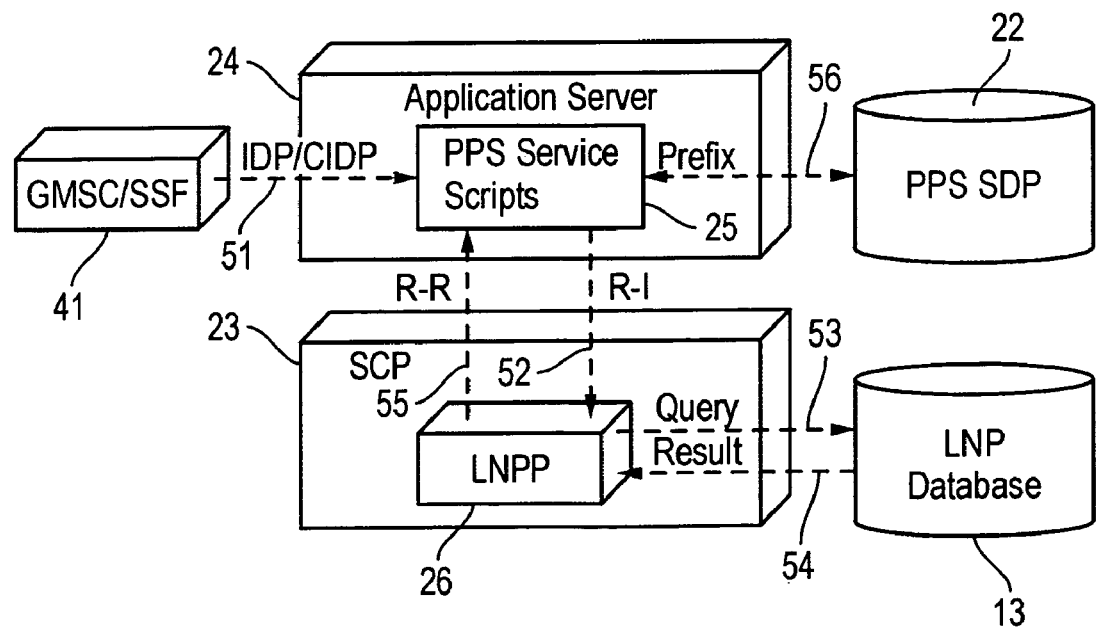
FIG. 5 is a simplified block diagram of the second embodiment of the system of the present invention when handling a mobile termination traffic case.

FIG. 5 is a simplified block diagram of the second embodiment of the system of the present invention when handling a mobile termination traffic case. In the mobile termination case, the call enters the system through the GMSC/SSF 41 which sends a CS1+ IDP or CIDP message 51 to the Application Server 24 where the message is received by the PSL Scripts 25. The IDP message contains the MSISDN of the PPS subscriber and the CdPN. The PSL Scripts send a CS1+ Retrieve-Invoke (R-I) message 52 to the LNPP 26 in the SCP 23 with the CdPN that potentially has been ported. The LNPP converts the CS1+ protocol to a protocol recognized by the LNP Database 13 such as an ANSI-41 interface, an 800 interface, or an INAP interface. The LNPP then sends a query 53 to the LNP Database 13 containing the CdPN received in the Retrieve-Invoke message.

The LNP Database returns a query result 54 to the LNPP. If the CdPN has been ported, the query result contains an RN. If no RN is received, it is assumed that the CdPN has not been ported. The LNPP converts the protocol and sends a CS1+ Retrieve-Result (R-R) message 55 back to the PSL Scripts 25 in the Application Server with the RN as an optional parameter. Based on the LNP Database query result received in the R-R message 55 from the LNPP, the PSL Scripts determine a prefix 56 used to identify whether the call is within the operator's Own Network 10, or in another network. Exemplary prefix values are shown above in Table 1.

The PSL Scripts 25 add the correct prefix to a Terminating Location Information parameter that is sent as part of each rated event (for example, First Interrogation, Intermediate Interrogation, or Final Report of Set Up USSD Call Back) to the PPS SDP 22 for rating. After rating the call in the PPS SDP, the PSL Scripts continue normal prepaid call processing with the prefix 56 in the Terminating Location Information taken into account.

Thus, in the present invention, the SCP 23 retrieves the ported information directly from the LNP database 13. The PPS service (either modified PPS Service Scripts in the SCP or modified PSL Scripts in the Application Server) then appends a prefix to the Originating Location Information or Terminating Location Information, depending on the traffic case, before communicating with the PPS SDP 22. This prefix indicates whether the call is made between subscribers of the operator's own network. The rating of the call in the PPS SDP takes this prefix into account.

As noted above, the tariff structures (data requirements only) in the PPS SDP 22 may also be updated. Based on the new parameters (consisting of a prefix and Originating/ Terminating Location Number) sent from the modified PPS Service Scripts 27, the prefix may be added to the number lists in the tariffs, and the rates may be differentiated based on the prefix (if desired).

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A method of determining a tariff for a real-time wireless service provided for a wireless call made to or from a ported telephone number, said method comprising the steps of:
receiving by real-time service scripts in a Service Control Point (SCP), a call setup message containing a called party number, said call setup message being formatted in a first signaling protocol;
sending the called party number to a protocol converter in the SCP;
converting in the protocol converter, the first signaling protocol to a second signaling protocol compatible with a Local Number Portability (LNP) database;
sending a query containing the called party number from the protocol converter to the LNP database;
receiving a query result from the LNP database, said result containing a routing number if the called party number has been ported;
determining by the service scripts whether the routing number points to a particular network; and
rating the call with a first tariff if the routing number points to the particular network.

2. The method of determining a tariff of claim 1, further comprising:
rating the call with a second tariff if the ported telephone number does not point to the particular network.

3. The method of determining a tariff of claim 1 wherein the step of determining whether the ported telephone number points to a particular network includes determining by the service scripts whether the routing number points to the particular network.

4. The method of determining a tariff of claim 3 wherein the step of rating the call with a first tariff includes:
modifying a message parameter to indicate that a routing number was returned, and the routing number points to the particular network;
sending the message parameter to a Service Data Point (SDP)to rate the call with the first tariff.

5. The method of determining a tariff of claim 4 wherein the step of rating the call with a second tariff includes:
modifying the message parameter to indicate that a routing number was returned, and the routing number does not point to the particular network; and
sending the message parameter to the SDP to rate the call with the second tariff.

6. A system in a radio telecommunications network for determining a tariff for a real-time wireless service provided for a wireless telephone call, said system comprising:
a Service Control Point (SCP) for accessing a Local Number Portability (LNP) database during call setup to determine whether the call is made to or from a ported telephone number, said SCP including;
service scripts that implement the real-time service; and
a protocol converter that receives a retrieve-invoke message from the service scripts and converts the retrieve-invoke message to a query message compatible with the LNP database;
means for determining whether the ported telephone number points to a particular network, in response to a determination that the call is made to or from a ported telephone number; and
means for assigning a tariff to the call in response to a determination that the call is made to or from a ported telephone number, and in response to a determination that the ported telephone number points to a particular network.

7. The system for determining a tariff for a real-time wireless service of claim 6 wherein the protocol converter in the SCP also receives a query result from the LNP database, and converts the query result to a retrieve-result message compatible with the service scripts that implement the real-time service.

8. The system for determining a tariff for a real-time wireless service of claim 7 wherein the retrieve-invoke message includes a called party number, and the query result includes a routing number if the called party number has been ported.

9. The system for determining a tariff for a real-time wireless service of claim 8 wherein the real-time service is a prepaid service (PPS), and the means for assigning a tariff to the call is a PPS Service Data Point (SDP) that receives an indication from the service scripts of whether the call is made to or from a ported telephone number, and whether the ported telephone number points to a particular network.

10. The system for determining a tariff for a real-time wireless service of claim 9 wherein the SDP assigns a second tariff if the ported telephone number does not point to the particular network.

11. A system in a radio telecommunications network for determining a tariff for a real-time wireless service provided for a wireless telephone call, said system comprising:
   means for accessing a Local Number Portability (LNP) database during call setup to determine whether the call is made to or from a ported telephone number, said accessing means including a protocol converter located in a Service Control Point (SCP) that receives a retrieve-invoke message including a called party number, and converts the retrieve-invoke message to a query message compatible with the LNP database, said protocol converter receiving the retrieve-invoke message from service scripts within the SCP that implement the real-time service, wherein the protocol converter also receives a query result from the LNP database and converts the query result to a retrieve-result message compatible with the service scripts that implement the real-time service, wherein the query result includes a routing number if the called party number has been ported;
   means for determining whether the ported telephone number points to a particular network, in response to a determination that the call is made to or from a ported telephone number, and
   means for assigning a tariff to the call in response to a determination that the call is made to or from a ported telephone number, and in response to a determination that the ported telephone number points to a particular network.

12. A service Control Point (SCP) in a telecommunications network comprising:
   service scripts that implement a real-time service, said scripts including:
      means for receiving a call setup message containing a called party number; and
      means for sending rated events to a Service Data Point (SDP) for assigning a tariff to a call; and
   an interface that receives the called party number in a signaling message from the service scripts, converts the signaling message to a query message compatible with a Local Number Portability (LNP) database, and sends the query message containing the called party number to the LNP database, said interface receiving a query result from the LNP database containing a routing number if the called party number is ported, and passing the routing number to the service scripts;
   wherein the means for sending rated events to the SDP sends an indication to the SDP of whether the called party number is ported-in or ported-out of a particular network.

13. The SCP of claim 12 wherein the service scripts implement a prepaid service.

* * * * *